Sept. 19, 1939.　　　　R. VOIGT　　　　2,173,489

HIGH TEMPERATURE TURBINE

Filed Oct. 7, 1937　　　2 Sheets-Sheet 1

WITNESSES:
R. J. Eisinger
James F. Mosser

INVENTOR
RUDOLF VOIGT
BY
A. B. Reaves
ATTORNEY

Sept. 19, 1939.　　　　　R. VOIGT　　　　　2,173,489

HIGH TEMPERATURE TURBINE

Filed Oct. 7, 1937　　　2 Sheets-Sheet 2

WITNESSES:

INVENTOR
RUDOLF VOIGT.
BY
ATTORNEY

Patented Sept. 19, 1939

2,173,489

UNITED STATES PATENT OFFICE 2,173,489

HIGH TEMPERATURE TURBINE

Rudolf Voigt, Berlin-Siemensstadt, Germany, assignor, by mesne assignments, to Westinghouse Electric & Manufacturing Company, a corporation of Pennsylvania Application October 7, 1937, Serial No. 167,803
In Germany October 9, 1936

2 Claims. (Cl. 308—77)

My invention relates to rotating machines subjected to high temperature, more particularly to turbines utilizing motive fluid at high temperature.

The object of the invention is to provide improved means for preventing excessive heating of the bearings by the heat in the turbine or other machine.

Turbines having hollow shafts, through which cooling medium is passed to prevent heating of the bearings, are known. Such an arrangement becomes of special importance if the turbine utilizes steam or gas at high temperature for motive fluid.

One cooling arrangement known heretofore comprises a shaft which is hollow over its entire length. The cooling medium enters the shaft at one end, passes through the entire length of the shaft, and leaves the same at the opposite end. This construction, however, is not very satisfactory because it precludes the use of a solid runner, and secondly because it does not prevent the heat radiating from the hot portion of the runner from reaching the bearing which is to be kept cool.

These disadvantages may be easily and certainly avoided according to this invention, by providing the shaft, which is hollow over the portions that are to be kept cool, with radial cooling medium outlets around the circumference between the rotor and the bearing. This permits the use of a solid runner disk. At the same time, the radiation of heat from the runner to the bearing is avoided to a great extent because the cooling medium leaving the shaft circumference provides a protecting screen which spreads out in front of the bearing.

The existence of this cooling medium screen is very valuable for another reason when used in connection with a steam turbine. In steam turbines, as a rule, the runner is followed, in the direction of the shaft, by a stuffing box and then by the bearing. If, in operation, leakage through the stuffing box becomes excessive, the steam leaking through the stuffing box may reach the bearing and condense, in which event the bearing may be damaged as a result of the presence of the condensate. This danger is avoided by my novel cooling medium flow arrangement.

These and other objects are effected by my invention as will be apparent from the following description and claims taken in connection with the accompanying drawings, forming a part of this application, in which:

Figure 1:
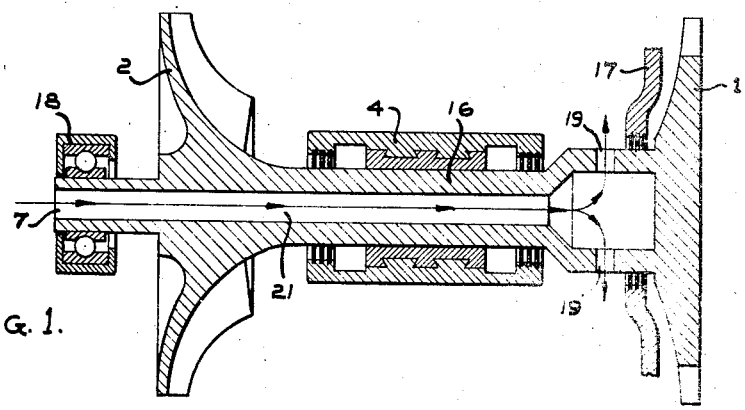
Fig. 1 is a longitudinal section showing one embodiment of my invention comprising a gas turbine driving a blower.
Figure 4:
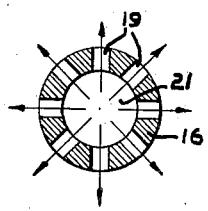
Fig. 4 is a cross-section of the hollow shaft at the cooling medium outlets; and, Fig. 5 is a longitudinal section showing my invention applied to a steam turbine.

Referring to Fig. 1 in detail, I show a gas turbine driving a blower. The gas turbine comprises a runner or rotor disk 1 overhung on a shaft 16 and enclosed within a casing 17. The shaft 16 is mounted in bearings 4 and 18, the bearing 4 being the one to be protected from the heat of the gas turbine. The blower rotor 2 is mounted on the shaft 16 between the bearings 4 and 18. In this embodiment, the shaft 16 is hollow from the left-hand end to the rotor disk 1, thereby forming the axial passage 21. The rotor disk 1, however, is solid. The shaft is further provided with radial outlet openings 19 disposed between the turbine casing 17 and the bearing 4, and communicating at their inner ends with the passage 21. The radial outlet openings are distributed over the circumference of the hollow shaft, as shown by the cross-section in Fig. 4. This view is also applicable to the other embodiments.

In the first embodiment, air from the atmosphere serves as the cooling medium. It enters the axial passage 21 at 7 and flows therethrough to the outlet openings 19, by which it is propelled and discharged radially outwardly. The flow of the air is indicated by the arrows. The passage 21 and the openings 19 are of sufficient size to provide for flow of cooling air in sufficient volume to protect the bearing 4 and the portion of the shaft 16 extending therethrough from the high temperature of the gas turbine. The air discharged from the outlet openings 19 forms a protecting screen around the shaft between the turbine casing 17 and the bearing 4.

Figure 2:
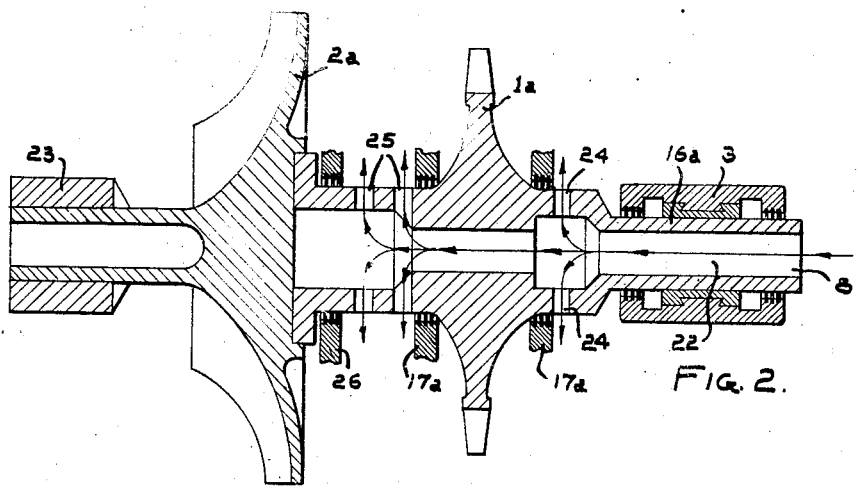
Figs. 2 and 3 are similar views of further embodiments.

The embodiment shown in Fig. 2 may be used where it is desired to have a solid blower rotor. The shaft 16a has a passage 22 extending along its axis from the right-hand end, through the turbine rotor 1a, to the solid blower rotor 2a. The shaft 16a is mounted in outboard bearings 3 and 23 at the turbine and blower ends, respectively. The shaft 16a is formed with radial outlet openings 24, disposed between the bearing 3 and the turbine casing 17a, and with similar openings 25 disposed between the turbine casing 17a and the blower casing 26. The openings 24 and 25 communicate at their inner ends with the passage 22.

In operation, air from the atmosphere enters the passage 22 at the right-hand end of the shaft, as indicated at 8, and flows through said passage to the left. A portion of the air stream is propelled by and flows radially through the outlet openings 24, while another portion passes on through the rotor disk to the outlet openings 25 and is discharged therethrough.

Figure 3:
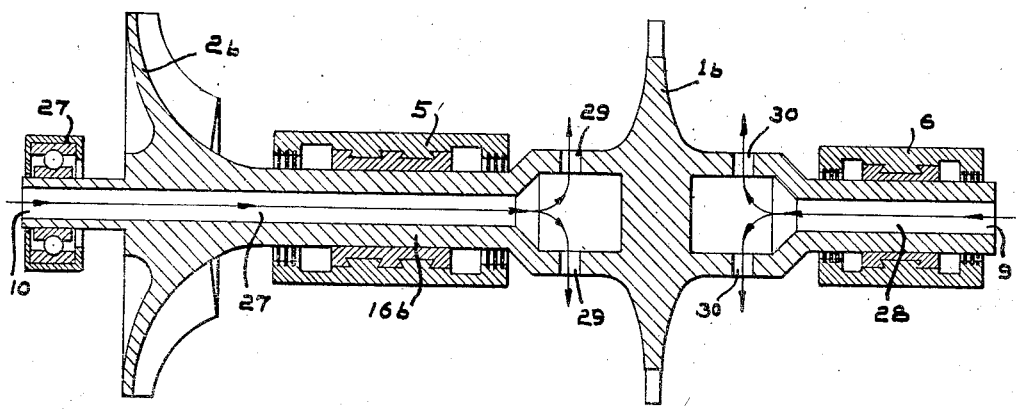

Fig. 3 shows another embodiment including a turbine rotor disk 1b and a blower rotor 2b mounted on a shaft 16b, the latter being supported and retained in the three bearings shown at 6, 5, and 27. The turbine rotor disk 1b is solid, the shaft 16b being provided with an axial passage 27 disposed to the left of the turbine rotor disk 1b, and an axial passage 28 disposed to the right thereof. The shaft 16b is provided with outlet openings 29 and 30 disposed on the left and the right, respectively, of the rotor disk and communicating at their inner ends with the passages 27 and 28, respectively.

In the operation of this embodiment, there are two streams of air, shown by the arrows, for cooling the portions of the shaft extending through the bearings 5 and 6. The two streams enter the passages 27 and 28 at 10 and 9, respectively, and are discharged through the outlet openings 29 and 30 to provide protecting screens for the bearings 5 and 6.

Figure 5:
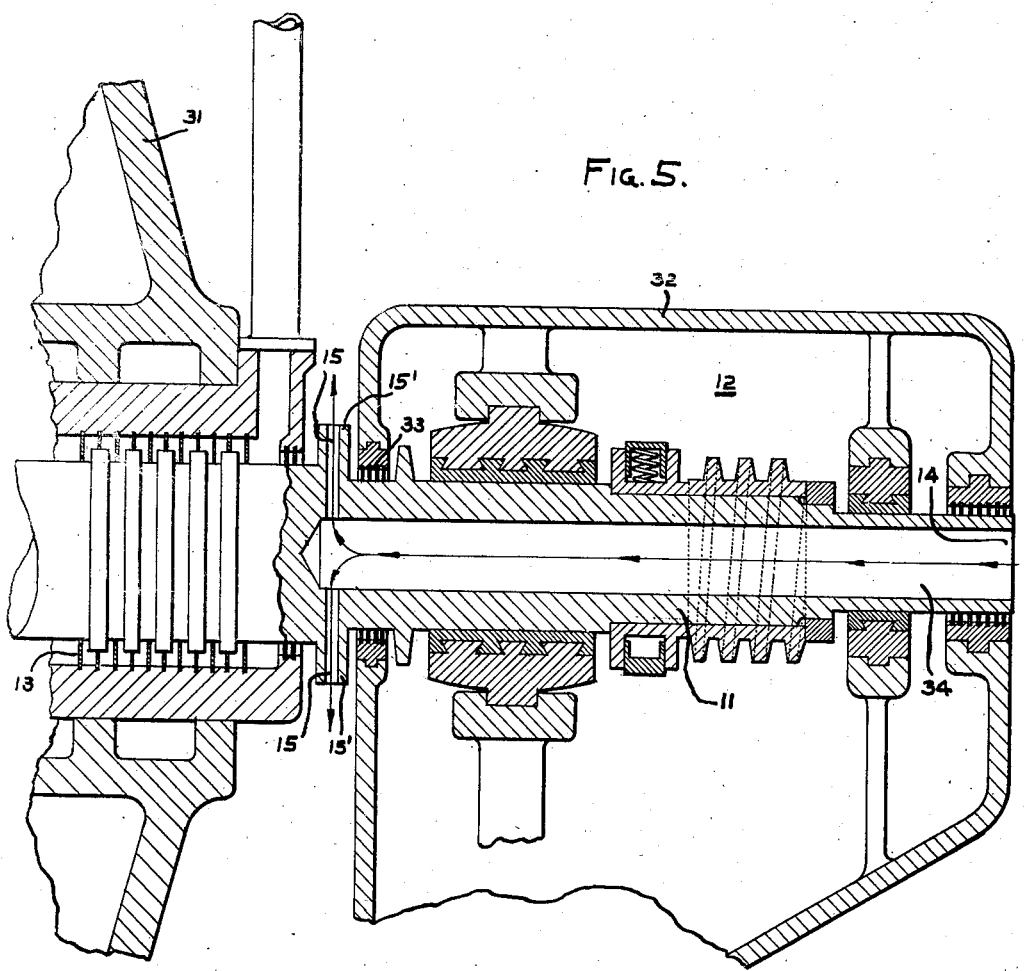

Fig. 5 shows the invention applied in connection with a steam turbine. The turbine comprises a shaft 11 extending through the shaft opening of the turbine casing 31, which is provided with gland strips 13 at the shaft opening. The rotor or runner of the turbine (not shown) is disposed within the casing to the left of the parts shown on the drawings. One of the bearings for the shaft is shown at 12 and is enclosed by a bearing housing 32 which is spaced somewhat from the turbine casing 31. The bearing housing 32 has gland strips 33 around the shaft opening.

In this embodiment, the shaft is provided with a flange 15' which projects radially therefrom and forms a baffle between the gland strips 13 of the turbine casing and the gland strips 33 of the bearing housing. The shaft 11 is formed with circumferentially distributed, radial outlet openings 15 extending through the flange 15' and communicating at their inner ends with an axial passage 34 which extends along the axle of the shaft from the openings 15 and through the portion of the shaft within the bearing housing to the right-hand end of the shaft.

Air from the atmosphere again serves as cooling medium. It enters the axial passage at 14, flows to the left to the openings 15, by which it is propelled and discharged therefrom in the form of an annular screen between the turbine casing and the bearing housing. The bearing 12 is protected from the heat of the turbine as in the other embodiments. In addition, any leakage from the gland strips 13 is deflected radially outwardly by the flange 15', thereby directing it away from the shaft opening of the bearing housing, and minimizing the possibility of its entering the bearing housing, where it might condense and result in damage to the bearing.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with closely spaced turbine and bearing casings having co-axial shaft openings, of a bearing supported within the bearing casing, a turbine shaft extending through said openings and having a portion fitting the bearing and a portion traversing the space between the casings, and means utilizing air to absorb heat from the portion of the shaft extending through the bearing and from the portion thereof between the casings, said means comprising an axial bore formed in the shaft and communicating with a circumferential series of radial passages formed in the portion of the shaft between the casings, said bore extending to the end of the shaft at the side of the bearing casing remote from the turbine to provide an inlet and said radial passages constituting a centrifugal impeller to induce flow of heat-absorbing air along the bore and through the radial passages to the space between the casings.

2. The combination with closely spaced turbine and bearing casings having co-axial shaft openings, of a bearing supported within the bearing casing, a turbine shaft extending through said openings and having a portion fitting the bearing and a portion traversing the space between the casings, said space-traversing portion having a flanged part, and means utilizing air to absorb heat from the portion of the shaft extending through the bearing and from the portion thereof between the casings, said means comprising an axial bore formed in the shaft and communicating with a circumferential series of radial passages formed in the flanged part of the space-traversing portion of the shaft, said bore extending to the end of the shaft at the side of the bearing casing remote from the turbine to provide an inlet and said radial passages constituting a centrifugal impeller to induce flow of heat-absorbing air along the bore and through the radial passages to the space between the casings.

RUDOLF VOIGT.